United States Patent [19]
Houser

[11] Patent Number: 5,134,974
[45] Date of Patent: Aug. 4, 1992

[54] PORTABLE CAT LITTER CASE

[76] Inventor: Raymond J. Houser, 1030 Westwind Ct., Fort Wayne, Ind. 46845

[21] Appl. No.: 756,990

[22] Filed: Sep. 9, 1991

[51] Int. Cl.5 ............................................... A01K 1/01
[52] U.S. Cl. ..................................... 119/168; 119/165
[58] Field of Search ........................ 119/161, 165, 168

[56] References Cited

U.S. PATENT DOCUMENTS

| | | | |
|---|---|---|---|
| 4,711,198 | 12/1987 | Mossbarger | 119/168 |
| 4,919,078 | 4/1990 | Morrison | 119/168 |
| 4,998,504 | 3/1991 | Ball | 119/168 |
| 5,007,530 | 4/1991 | Weismantel | 119/168 X |
| 5,035,205 | 7/1991 | Schiller et al. | 119/168 |

*Primary Examiner*—Gene Mancene
*Assistant Examiner*—Thomas Price
*Attorney, Agent, or Firm*—Lundy & Associates

[57] ABSTRACT

A portable cat litter case having a bottom with upstanding walls and an interior. There is a top having walls depending from the top and an interior and an exterior. The bottom has a pair of side guards pivotally secured to the bottom walls. A pair of clips that are complementary to the side guards are provided and secured to the top interior. The clips receive the side guards when the top and the side guards are vertical. A liner bag is in the bottom and covers the side guards. Cat litter is in the bottom and the side guards can fold into the bottom and rest on the cat litter and the top can rest on the side guards. A latch locks the top to the bottom. The bottom has a handle on its exterior.

27 Claims, 4 Drawing Sheets

PORTABLE CAT LITTER CASE

BACKGROUND OF THE INVENTION

The present invention pertains to cat litter boxes and more particularly pertains to a portable cat litter box.

Cat litter boxes are used as a depository for cat excrement. They are generally composed of a vessel. The vessel generally contains cat litter, a mixture of fluid absorbent material namely clay chips and sometimes a deodorizing material. When a cat uses a litter box, the cat generally stands on the cat litter, relieves himself, and by using his paws scrapes cat litter over his feces in an attempt to bury it; sometimes he is successful, other times not. Most of the vessels currently in production have a number of deficiencies. Because some cats are very modest and do not like anyone observing them in the act of using their litter box, some litter boxes have walls and a top, thereby forming a complete enclosure. The enclosure helps contain the mess and hides the unpleasant sight of a cat litter box.

Cat litter boxes may be offensive to some people who do not like cats or claim to be allergic to cats. Many of their unpleasant reactions arise from the mere sight of a cat litter box at close quarters even though the box may be empty or free of odors. These people's reactions may manifest in disapproving stares or verbal tirades directed toward the cat owner causing him/her greater embarrassment over what he/she already endures in carrying the litter box in public.

The cat owner who is not dissuaded by such unkindly treatment from others and is still hopeful of traveling with his animal will encounter many other problems. The conventional portable litter box is quickly identified as such when boarding public conveyances. Boarding these conveyances may be inconvenienced and even precluded once a litter box is observed as part of a person's luggage. Assuming no problem develops, the cat owner may still be critically scrutinized much to his discomfort and embarrassment.

Because cats do not bark, bite, present a ferocious appearance, or need to be led around the premises of a hotel or motel to deposit their feces, many hotels and motels permit cats to accompany their guests. Even so, the most pleasant hotel and motel staff may express concern when they observe a person walking through the lobby or onto the elevator with a very obvious cat litter box as part of his luggage—especially if the bell person has to carry it.

Another problem with traveling with a cat is the fact that portable litter boxes occupy a lot of space. Conventional portable litter boxes are large and bulky and are not practical in an automobile setting. It is difficult to locate amidst luggage in such a place where it can be stabilized and easily attended. The conventional litter boxes are always vented into the confines of the car and if the cat uses it while the car is in motion, the owner must stop immediately and clean out the litter box or withstand the build up of obnoxious odors. Litter box clean up is not only a problem in a cluttered car, but can be messy regardless of where the litter box is.

Cat litter may spill out of the vessel in which it is contained for many reasons, not the least of which is careless handling by the owner. The cat itself may spill litter onto the floor as it digs and scratches in the cat litter attempting to cover its waste. Some litter boxes have a one-piece molded plastic top with high sides that rest upon the lower vessel. At the joint where top and bottom units meet, litter accumulates because of the cat's activity and upon removal of the top unit for cleaning the accumulated litter spills onto the floor around the lower box. Further, whenever it becomes necessary to move the litter box for traveling or some other purpose, spillage is always possible and likewise is always undesirable.

It is therefore highly desirable to provide an improved portable cat litter box.

It is also highly desirable for traveling with a cat to provide an improved portable cat litter box that will reduce or eliminate unpleasant odors attributable to cat litter boxes while in transport.

It is also highly desirable to provide an improved portable cat litter box that is discrete in its appearance.

It is also highly desirable to provide an improved portable cat litter box that is compact in size and convenient to use.

It is also highly desirable to provide an improved portable cat litter box that reduces or eliminates litter spillage while being used.

It is also highly desirable to provide an improved portable cat litter box that provides for a quick and easy clean up.

It is also highly desirable to provide an improved portable cat litter box that can be easily carried without litter spillage or emitting unpleasant odors.

It is also highly desirable to provide an improved portable cat litter box that can replace current cat litter boxes.

It is finally highly desirable to provide an improved portable cat litter box which meets all of the above desired features.

SUMMARY OF THE INVENTION

It is an object of the invention to provide an improved portable cat litter box.

It is also an object of the invention to provide an improved portable cat litter box for traveling with a cat that will reduce or eliminate unpleasant odors attributable to cat litter boxes while in transport.

It is also an object of the invention to provide an improved portable cat litter box that is discrete in its appearance.

It is also an object of the invention to provide an improved portable cat litter box that is compact in size and convenient to use.

It is also an object of the invention to provide an improved portable cat litter box that reduces or eliminates litter spillage while being used.

It is also an object of the invention to provide an improved portable cat litter box that provides for a quick and easy clean up.

It is also an object of the invention to provide an improved portable cat litter box that can be easily carried without litter spillage or emitting unpleasant odors.

It is also an object of the invention to provide an improved portable cat litter box that can replace current cat litter boxes.

It is finally an object of the invention to provide an improved portable cat litter box which provides all of the above objects.

In the broader aspects of the invention there is provided a portable cat litter case having a bottom with upstanding walls and an interior. There is a top having walls depending from the top and an interior and an exterior. The bottom has a pair of side guards pivotally secured to the bottom walls. A pair of clips that are complementary to the side guards are provided and secured to the top interior. The clips receive the side guards when the top and the side guards are vertical. A liner bag is in the bottom and covers the side guards. Cat litter is in the bottom and the side guards can fold into the bottom and rest on the cat litter and the top can rest on the side guards. A latch locks the top to the bottom. The bottom has a handle on its exterior.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figures 1, 2:
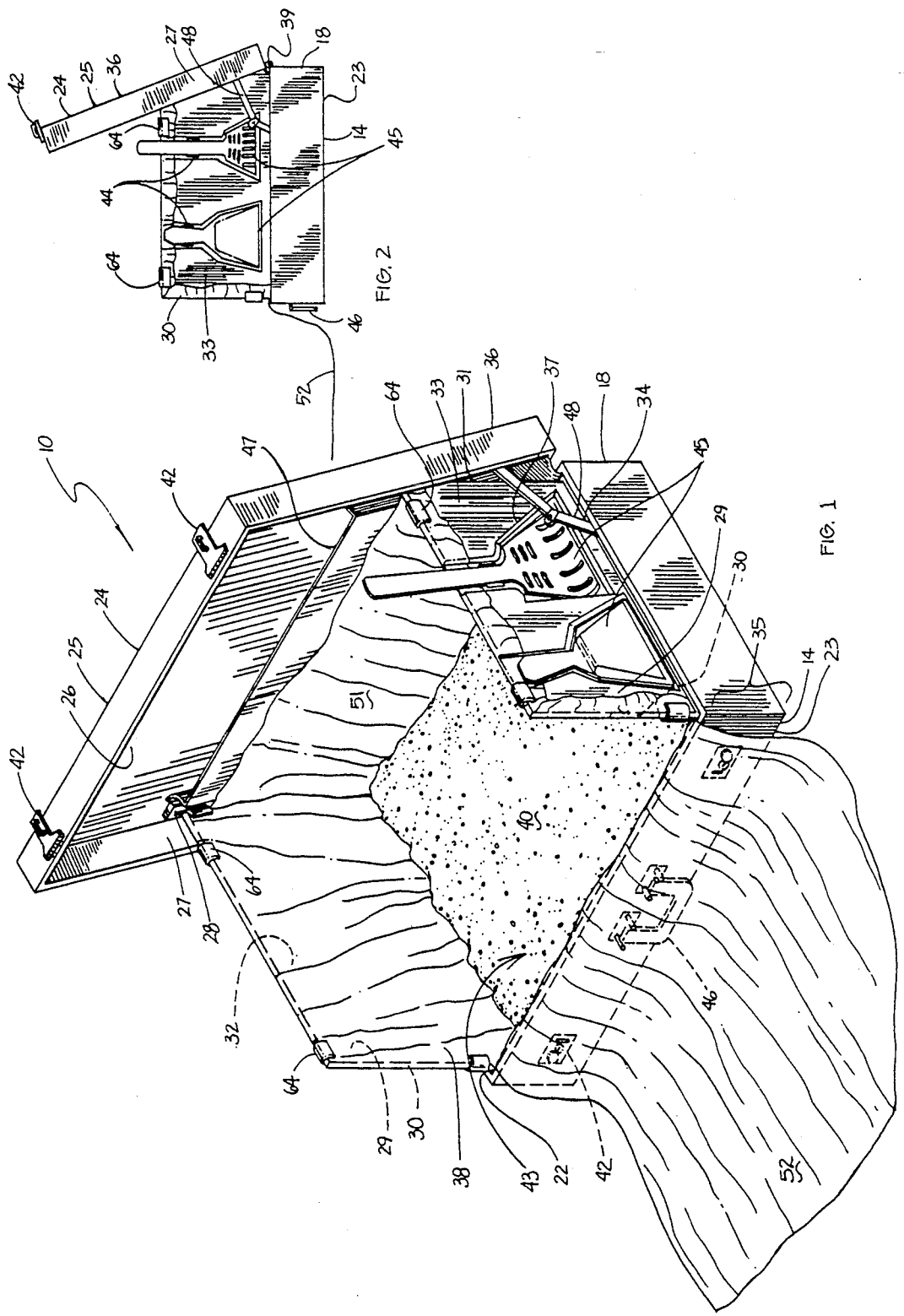
FIG. 1 is a perspective view of an embodiment of the portable cat litter box of the invention with its top and side guards in their vertical position.
FIG. 2 is a side view of an embodiment of the portable cat litter box of the intention showing its top and side guards in their vertical position.

The portable cat litter case 10 of the invention has a bottom 4 with upstanding bottom walls 18. Bottom walls 18 form a bottom interior 22 with bottom 14. Bottom 14 also has a bottom exterior 23. Portable cat litter case 10 has a top 24 with top depending walls 27. Top 24 and top walls 27 form a top exterior 25 and a top interior 26. In a specific embodiment, top 24 and bottom 14 may be flat or may be strengthened with structural members or ribs or molded shapes so as to improve the rigidity and volume of bottom interior 22 and top interior 26.

Top exterior 25 is joined to bottom exterior 23 by a hinge 39 enabling top 24 to move between a horizontal position 41 and a vertical position 36. See FIGS. 1 and 6. In the embodiment illustrated, hinge 39 may be a single hinge as shown in FIG. 2 or a pair with the two hinges being spaced apart. In another specific embodiment, top 24 can be joined to bottom 14 by a single hinge made of thin plastic, fabric tape or a suitable construction to enable top 24 to be movable between a horizontal position 41 and vertical position 36 relative to the bottom 14.

Top interior 26 and bottom interior 22 have a pivoted link 48 secured thereto between bottom walls 18 of bottom interior 22 and top walls 27 of top interior 26. Pivoted link 48 provides a lock so that top 24 can be secured in vertical position 36 relative to bottom 14. However, in another specific embodiment pivoted link 48 can be eliminated as top 24 can be fastened in vertical position 36 by another means that will be mentioned hereinafter. Alternatively, in another specific embodiment, as shown in the figures, a pair of pivoted links can be positioned opposite each other.

Figure 4:
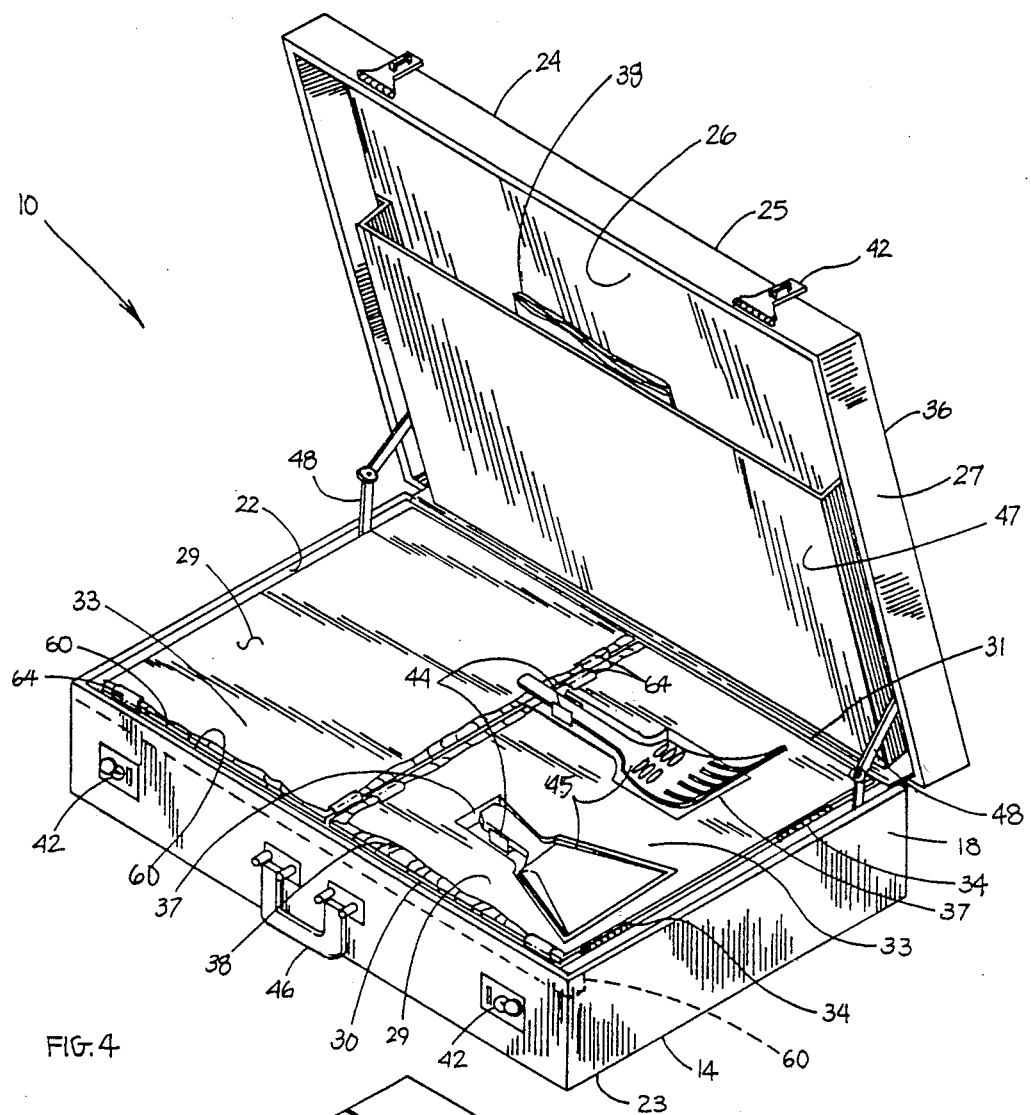
FIG. 4 is also a perspective view of an embodiment of the portable cat litter box showing its top in the vertical position with side guards in the horizontal position.

A pair of side guards 29 each having forward ends 30 and rear ends 31 and active surfaces 32 and passive surfaces 33 are secured to bottom interior 22 of bottom walls 18 diametrically opposed to one another. Side guards 29 are secured to bottom walls 18 spaced apart from bottom 14 a distance or space 35 by a guard hinge. In the embodiment illustrated, guard hinge is a pair of guard hinges 34. In another specific embodiment, a single guard hinge 34 is placed equidistant from forward end 30 and rear end 31 of side guard 29. Still another specific embodiment can exist whereby side guards 29 and bottom walls 18 are a single molded piece, for example of plastic, with an integral flexible hinge so that side guards 29 are movable between vertical position (FIG. 1) and horizontal position (FIG. 4). In their horizontal position, side guards 29 rest on front panel rest 60 to maintain their horizontal position with respect with bottom 14.

Top interior 26 has a pair of clips 28 oppositely disposed and secured therein. Clips 28 are made to receive rear ends 31 of side guards 29 when both top 24 and side guards 29 are in vertical positions as shown in FIGS. 1 and 2. The resistance of side guards 29 in clips 28 maintain top 24 and side guards 29 in their vertical positions with respect to bottom 14. Clips 28 may be made of metal, plastic or be a snap button or a Velcro patch so as to be suitable for securing top 24 to side guards 29 so that the vertical positions of the portable cat litter case 10 will be sustained while in use. In the embodiment illustrated, at least one of passive surfaces 33 of side guards 29 have a recess 37 with tool cleats 44 secured thereto. Tool cleats 44 secure litter tools 45 onto side guards 29. In a specific embodiment, recess 37 is complementary to the shape of litter tools 45. Litter tools 45, in the embodiment illustrated, include a miniature scoop, broom, and dust pan. Another specific embodiment may include other tool cleats 44 and litter tools 45 as desired.

Recess 37 receives litter tools 45 while tool cleats 44 secure litter tools 45 so as to enhance the compartmentalization of the portable cat litter case 10. More particularly, recess 37 ensures passage of top walls 27 and pivoted link 48 in conjunction with side guards 29 all to be movable independently without contacting each other as top 24 and side guards 29 are moved between their vertical positions and horizontal positions.

Bottom interior 22 has a liner bag 38 therein. Referring to FIG. 1, liner bag 38 extends vertically and covers active surfaces 32 of side guards 29 and is secured to side guard 29 by clips or adhesive strips or Velcro strips 64. A preferred embodiment of the portable cat litter case 10 has liner bags 38 with pleats or folds 49 therein, so as to be complementary to bottom walls 18. The liner bag 38 may be designed to fit bottom 14 of portable cat litter case 10. Liner bag 38 is litter proof and of an adequate gauge (thickness) whereby cat litter 40 can be retained in liner bag 38 when removed from bottom 14. The term "litter proof" is used herein to refer to a material through which litter cannot pass and is, in addition, moisture proof or moisture absorbent and impervious to moisture. In a specific embodiment, liner bag 38 can be made of moisture proof material such as plastic material. Liner bag 38 in conjunction with side guards 29 and bottom walls 18 form a cat litter reservoir 43 with apron 52 and bottom 14 when litter box 10 is closed that is odor proof and litter proof.

Figure 5:
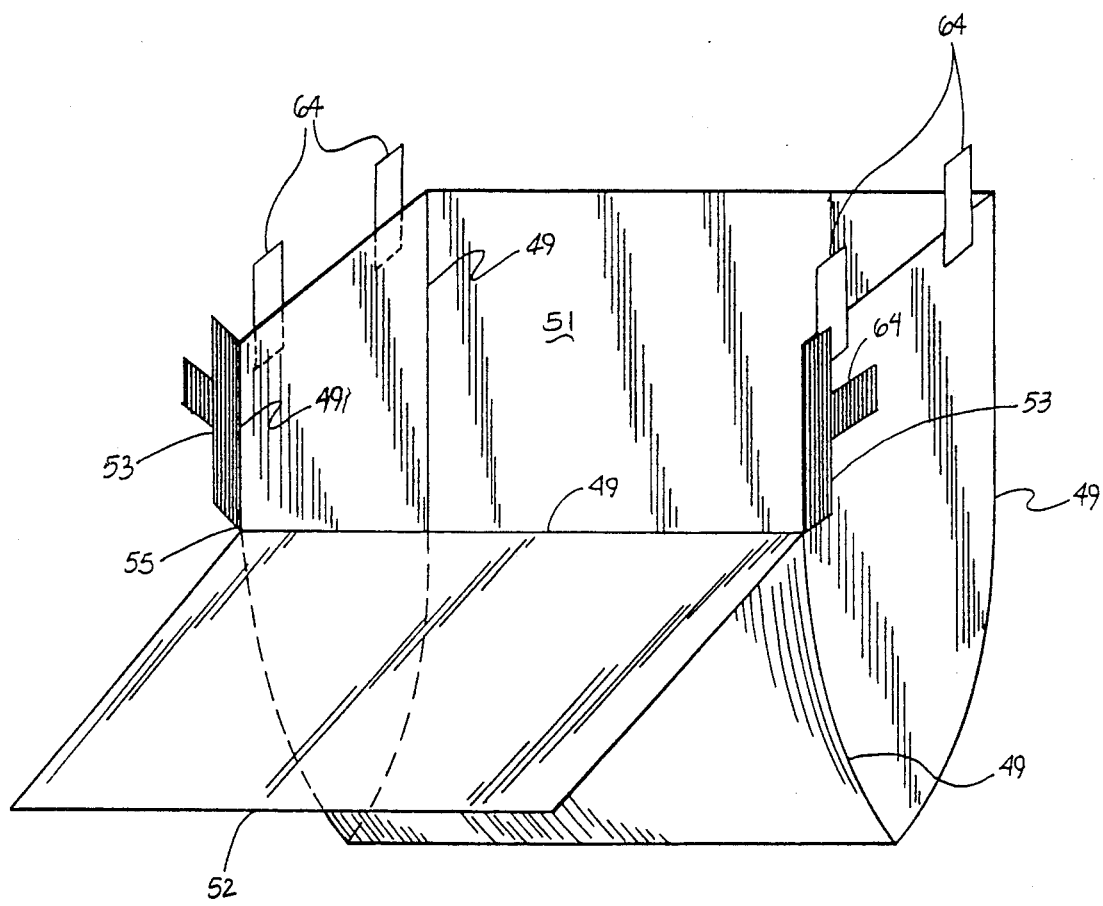
FIG. 5 is a perspective view of the liner bag of the invention.

Referring now to FIG. 5, liner bag 38 has pleats or folds 49 being complementary to bottom 14. Pleats 49 enhance manageability by allowing liner bag 38 to generally assume the shape defined by bottom interior 22. Cuts 55 in liner bag 38 form flaps 53 that fold around foward ends 30 rearwardly toward rear ends 31 of side guards 29. Flaps 53 may be secured to side guard 29 by adhesive tabs 64, adhesive tape or other suitable means. Apron pleat 49 of liner bag 38 allows apron 52 to be moved into operational position as shown in FIG. 1 and storage position as shown in FIG. 4 as desired. In the embodiment illustrated, liner bag 38 with apron 52, pleats 49, cuts 55, and flaps 53 are specially designed and can be mass produced by a bag manufacturer.

In the embodiment illustrated in FIG. 1, top interior 26 has a storage pouch 47 secured thereto. Storage pouch 47 can be made of plastic, paper, or other suitable material and may be secured to top interior 26 using staples, Velcro, strips, snap buttons, adhesive or any other suitable means as desired. Storage pouch 47 may be used for extra liner bags 38 and/or other cat accessories. An additional storage pouch 47 can be attached to side guard 29 as shown in FIG. 3.

Figure 3:
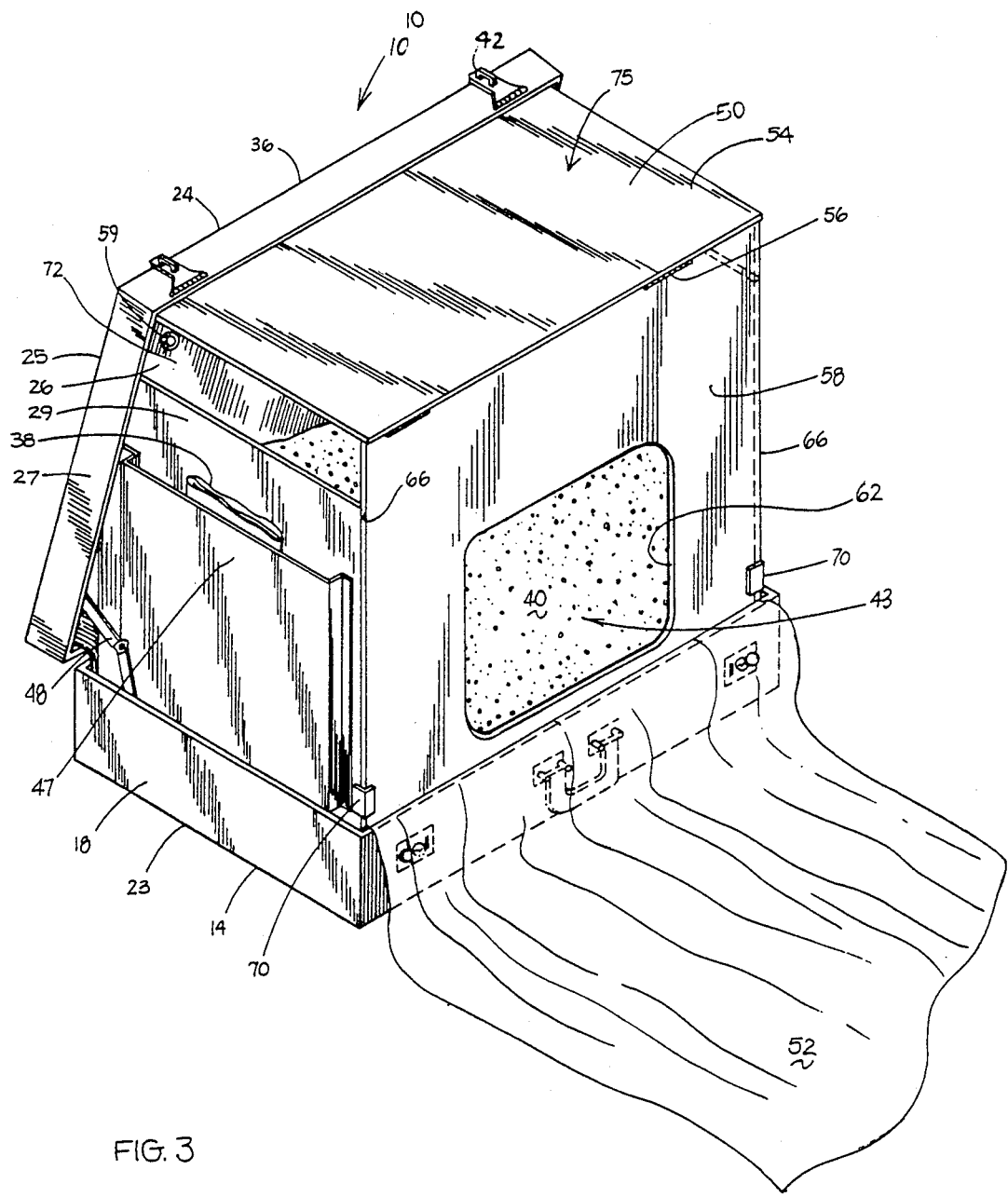
FIG. 3 is a perspective view like that in FIG. 1 of an embodiment of the portable cat litter box of the invention with its side guards in their vertical position and its enclosure attachment secured thereto.

Referring to FIG. 3, an enclosure attachment 50 can be secured to the portable cat litter case 10. The enclosure attachment 50 is composed of a top panel 54 and a front guard 58 secured to each other by an enclosure hinge 56 so that top panel 54 and front guard 58 can fold together and lie adjacent to each other much like the pages of a book. Enclosure attachment 50 in the embodiment illustrated can be secured to top interior 26 of top 24 in a folded condition using snap buttons 59 or any other suitable means as desired for storage. Another specific embodiment includes instead of a fastening mechanism like snap buttons 59, a third panel pivotally secured to top interior 26 so that top panel 54 and front guard 58 fold adjacent each other as above described within top 24. Front guard 58 has a bore 62 that is suitable for the passage of a cat therethrough. When assembled, as shown in FIG. 3, the front guard 58 extends from top interior 26 downwardly relative to top panel 54 that is in a horizontal position. Front guard 58 is longer than side guards 29 and rests on front panel and side guard rest 60 on bottom interior 22 of bottom wall 18 leaving space 72 between top 24 and side guards 29 to provide ventilation and light while enclosure attachment 50 is secured. Front guard 58 has a pair of fasteners 70 that are secured to its two opposite side edges 66 and the forward ends 30 of side guards 29. Top interior 26, side guards 29, front guard 58, and top panel 54 with bore 62 suitable for the passage of a cat therethrough, define cat enclosure 75. Cat enclosure 75 minimizes cat litter spillage and provides security for modest cats.

In operation, the portable cat litter case 10 in its vertical position 36 and operative mode provides a compact, portable and discrete litter box for a cat. Top 24 is positioned in its vertical position 36 along with side guards 29. Rear ends 31 of side guards 29 are received by clips 28 which are secured to top 24 within top interior 26 thereby securing cat litter case 10 in its vertical position.

Figure 6:
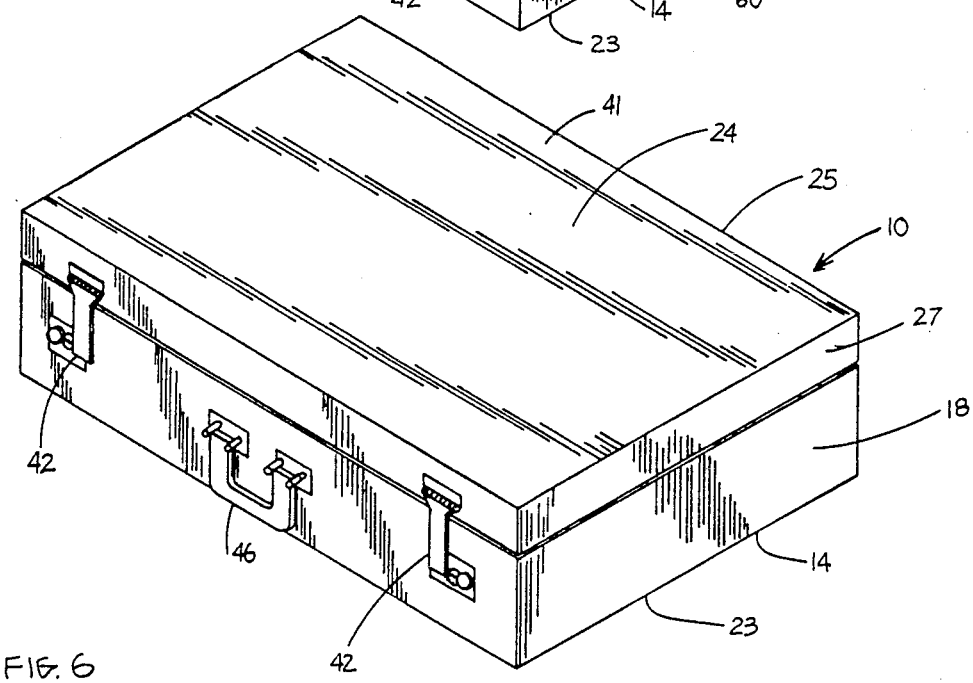
FIG. 6 is a perspective view of the portable cat litter box of the invention in its collapsed condition.

Referring generally to FIGS. 1, 2 and 4, with side guards 29 and top 24 respectively in their vertical positions and cat litter 40 in liner bag 38 in bottom 14, a cat can position itself on cat litter 40 on liner bag 38 in bottom 14 and relieve itself therein by depositing its waste on cat litter 40. Cat may then proceed to cover its feces by scratching into cat litter 40. The cat may then proceed on its way by stepping out of bottom 14. The portable cat litter case 10 prevents litter spillage and may be easily collapsed as shown in FIG. 6 and discretely carried away.

Referring also to FIG. 4, apron 52 of liner bag 38 is positioned between the litter and the active surfaces, 32 of side guards, 29 when side guards 29 are in their horizontal position as shown. With top 24 in its vertical position 36, apron 52 of liner bag 38 can be unfolded from covering the litter so as to extend outwardly of box 10. After the cat has relieved itself, any litter spillage that has been displaced upon apron 52 can be is reclaimed by cat litter reservoir 43 upon folding apron 52 and folding the same inwardly toward bottom 14. Litter tools 45 are conveniently accessible in recess 37 of passive surface 33 of at least one side guard 29 so that any excess litter spillage can be quickly and conveniently swept and reclaimed by cat litter reservoir 43. In the embodiment illustrated in FIG. 3 with the portable cat litter case 10 of the invention shown with the enclosure attachment 50, the storage pouch 47 may be secured to passive surface 33 of one of the side guards 29.

The enclosure attachment 50 is removable entirely from the portable cat litter case 10 of the invention or may be made a permanent attachment thereto as desired. In order to disassemble the enclosure attachment 50 a pair of fasteners 70 securing front guard 58 to side guards 29 are made to selectively release forward ends 30 of side guards 29. Front guard 58 is lifted from front panel rest 60 and folded inwardly toward top interior 26 so that front guard is made to swing toward top interior 26 utilizing enclosure hinge 56 thereby causing front guard 58 to fold and lie adjacent to top panel 54, much like the pages of a book. In another embodiment, top panel 54 is detached from top 24 by snaps 59, folded as above described and placed in top interior 26 for storage. Enclosure attachment 50 may be optional as desired, but when used minimizes litter spillage and provides modest cats the security necessary for a tranquil state of mind while traveling.

Apron 52 of liner bag 38 is then folded likewise toward bottom interior 22 and is positioned on cat litter 40 in bottom 14. Apron 52 enables the pet owner to reclaim litter spillage and improves the seal that makes cat litter reservoir 43 litter proof. Cat litter reservoir 43 is defined by apron 52 back panel 51 side guards 29 and bottom walls 18. Clips 28 are made to release rear ends 31 of side guards 29 thereby enabling side guards 29 to be placed in their horizontal position with active surfaces 32 resting on front panel rest 60 and overlaying apron 52 and back panel 51 and cat litter 40 with passive surfaces 33 adjacent top interior 26 as top 24 is positioned in its horizontal position 41.

The cat litter reservoir 43 is thus tightly sealed thereby eliminating any odors, and making it impossible for cat litter 40 to spill therefrom. Top 24 is secured to bottom 14 by use of latch 42 on top exterior 25 and bottom exterior 23. Top 24 and bottom 14 secured together define an exterior 23 and 25 similar to that of a briefcase or other rigid sided discrete traveling case.

In the embodiment illustrated, a handle is secured to bottom exterior 23 of portable cat litter case 10 so that the entire compartmentalized portable cat litter case 10 of the invention may be carried virtually anywhere. Another embodiment has a leather shoulder strap or other harness mechanism to enable the portable cat litter case 10 to be carried on the shoulder. Still another specific embodiment has wheels on the exterior of the bottom walls 18 so that the portable cat litter case 10 may be rolled down hallways and other corridors characteristic of those encountered when traveling.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

What is claimed is:

1. A portable litter box comprising a bottom with upstanding walls extending generally vertically relative to said bottom, said bottom walls defining an interior and an exterior, a top with top walls, said top walls extending generally vertically relative to said top and defining an interior and an exterior, a pair of clips being oppositely disposed and secured to said top interior, a pair of side guards having forward ends and rear ends and active surfaces and passive surfaces, said side guards being oppositely disposed and pivotally secured to said bottom walls spaced from said bottom, said side guards being movable between a horizontal position and a vertical position relative to said bottom, said rear ends of said side guards being complementary to said clips, said clips receiving said rear ends when said side guards are in said vertical position, a cat litter liner bag in said bottom, a hinge joining said top to said bottom, said top being movable between a generally horizontal and a generally vertical position relative to said bottom, a latch secured to said top and said bottom respectively, said side guards and said top in said horizontal position with said active surfaces of said side guards adjacent to but spaced from said bottom and said passive surfaces adjacent to but spaced from said said top define a cat litter reservoir with said bottom, said reservoir being litter proof, said top being secured to said bottom in said horizontal position by said latch and said hinge, whereby said portable litter box can be travel ready and used without litter spillage in said bottom.

2. The portable litter box of claim 1 wherein said portable litter box is rectangular in shape.

3. The portable litter box of claim 1 wherein said top walls and said bottom walls are rigid.

4. The portable litter box of claim 1 wherein said portable litter box is a briefcase with a handle.

5. The portable litter box of claim 1 wherein said liner bag is a plastic trash bag.

6. The portable litter box of claim 1 wherein said clips are snaps.

7. The portable litter box of claim 1 wherein said clips are Velcro strips.

8. The portable litter box of claim 1 wherein said liner bag in said bottom has pleats at distal ends complementary to said bottom, said liner bag extends vertically and covers at least half of said top interior and all of said active surfaces of said side guards forming a seal, said liner bag being litter proof.

9. The portable litter box of claim 1 wherein said liner bag has an apron, said apron having an open position and a closed position, said open position extending horizontally beyond said bottom wall opposite said hinge, whereby litter spillage may be captured on said apron.

10. The portable litter box of claim 9 wherein said apron has a second pleat complementary to said bottom interior wall opposite said hinge, whereby said apron may be folded into said bottom and placed in said closed position, whereby litter spillage may be reclaimed by said litter reservoir.

11. The portable litter box of claim 1 wherein said liner bag is secured to said side guards.

12. The portable litter box of claim 11 wherein said liner bag is secured to said side guards by adhesive strips.

13. The portable litter box of claim 11 wherein said liner bag is secured to said side guards by clips.

14. The portable litter box of claim 11 wherein said liner bag is secured to said side guards by Velcro strips.

15. The portable litter box of claim 1 wherein at least one of said side guards has a recess therein, a litter tool being positioned in said recess.

16. The portable litter box of claim 1 wherein said top interior has a storage pouch secured thereto.

17. The portable litter box of claim 16 wherein said storage pouch is made of paper.

18. The portable litter box of claim 16 wherein said storage pouch is made of plastic.

19. The portable litter box of claim 16 wherein said storage pouch is secured to said top interior by snaps.

20. The portable litter box of claim 16 wherein said storage pouch is secured to said top interior by adhesive.

21. The portable litter box of claim 16 wherein said storage pouch is secured to said interior by Velcro strips.

22. The portable litter box of claim 1 wherein a pivoted link is secured between said top interior and said bottom interior.

23. The portable litter box of claim 1 wherein said top interior has an enclosure secured thereto, said enclosure having a top panel pivotally secured to said top interior and a front guard pivotally secured to said top panel, said top panel and said front guard being movable between horizontal and vertical positions relative to said top, respectively, a bore in said front guard suitable for the passage of a cat therethrough, said front guard having two opposite side edges, said opposite side edges being detachably connected to said forward ends of said side guards.

24. The portable litter box of claim 23 wherein at least one of said passive surfaces has a storage pouch secured thereto.

25. A portable litter box comprising a bottom with upstanding walls extending generally perpendicular to said bottom, said bottom walls defining an interior and an exterior, a top with top walls, said top walls extending generally perpendicular to said top and defining an interior and an exterior, a pair of side guards having forward ends and rear ends and active surfaces and passive surfaces, said side guards being oppositely disposed and pivotally secured to said bottom walls spaced from said bottom, said side guards being movable between a horizontal position generally overlaying said bottom and a vertical position generally perpendicular to said bottom, said rear ends of said side guards being detachably secured to said top, a cat litter liner bag in said bottom, a hinge joining said top to said bottom, said top being movable between a generally horizontal and a generally vertical position relative to said bottom, a latch secured to said top and said bottom respectively, said side guards and said top in said horizontal position with said active surfaces of said side guards adjacent to but spaced from said bottom and said passive surfaces adjacent said interior of said top to define a cat litter reservoir with said bottom, said reservoir being litter proof, said top being secured to said bottom by said latch and said hinge.

26. A portable litter box comprising a bottom with upstanding walls extending generally perpendicular to said bottom, said bottom walls defining an interior and an exterior, a top with top walls, said top walls extending generally perpendicular to said top and defining an interior and an exterior, a pair of side guards having forward ends and rear ends and active surfaces and passive surfaces, said side guards being oppositely disposed and pivotally secured to said bottom walls spaced from said bottom, said side guards being movable between a horizontal position generally overlaying said bottom and a vertical position generally perpendicular to said bottom, a cat litter liner bag in said bottom, a hinge joining said top to said bottom, said top being movable between a generally horizontal and a generally vertical position relative to said bottom, means for retaining said top and side guards in said vertical position, a latch secured to said top and said bottom respectively, said side guards and said top in said horizontal position with said active surfaces of said side guards adjacent to but spaced from said bottom and said passive surfaces adjacent said interior of said top to define a cat litter reservoir with said bottom, said reservoir being litter proof, said top being secured to said bottom by said latch and said hinge.

27. The portable litter box of claim 1 wherein at least one of said side guards has a tool cleat secured thereto, a litter tool being positioned in said tool cleat.

* * * * *